Nov. 5, 1929.  H. THOMAS  1,734,752
METHOD OF AND APPARATUS FOR MAKING BOLTS
Filed Jan. 26, 1927  4 Sheets-Sheet 1
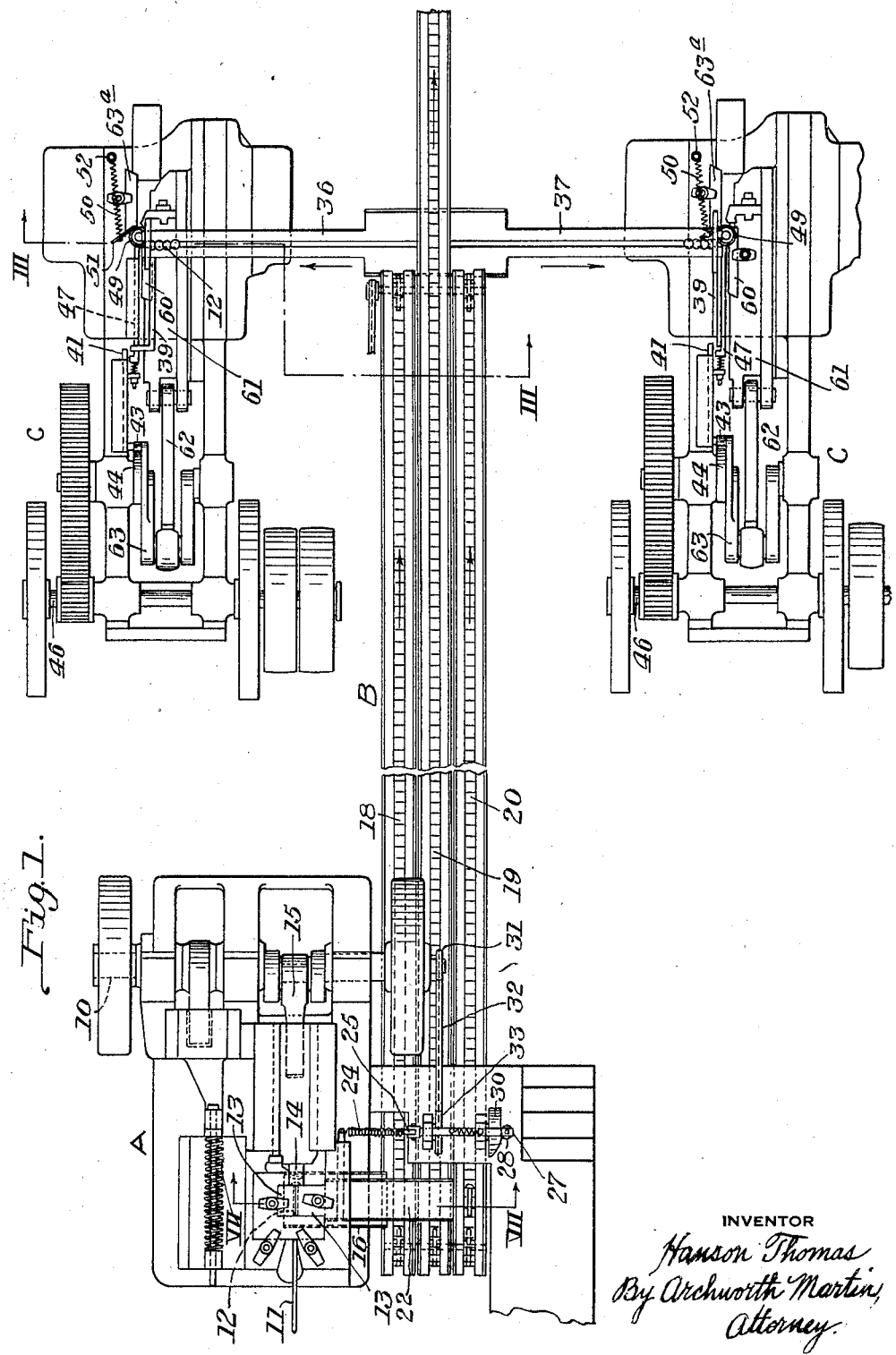
INVENTOR
Hanson Thomas
By Archworth Martin,
Attorney.

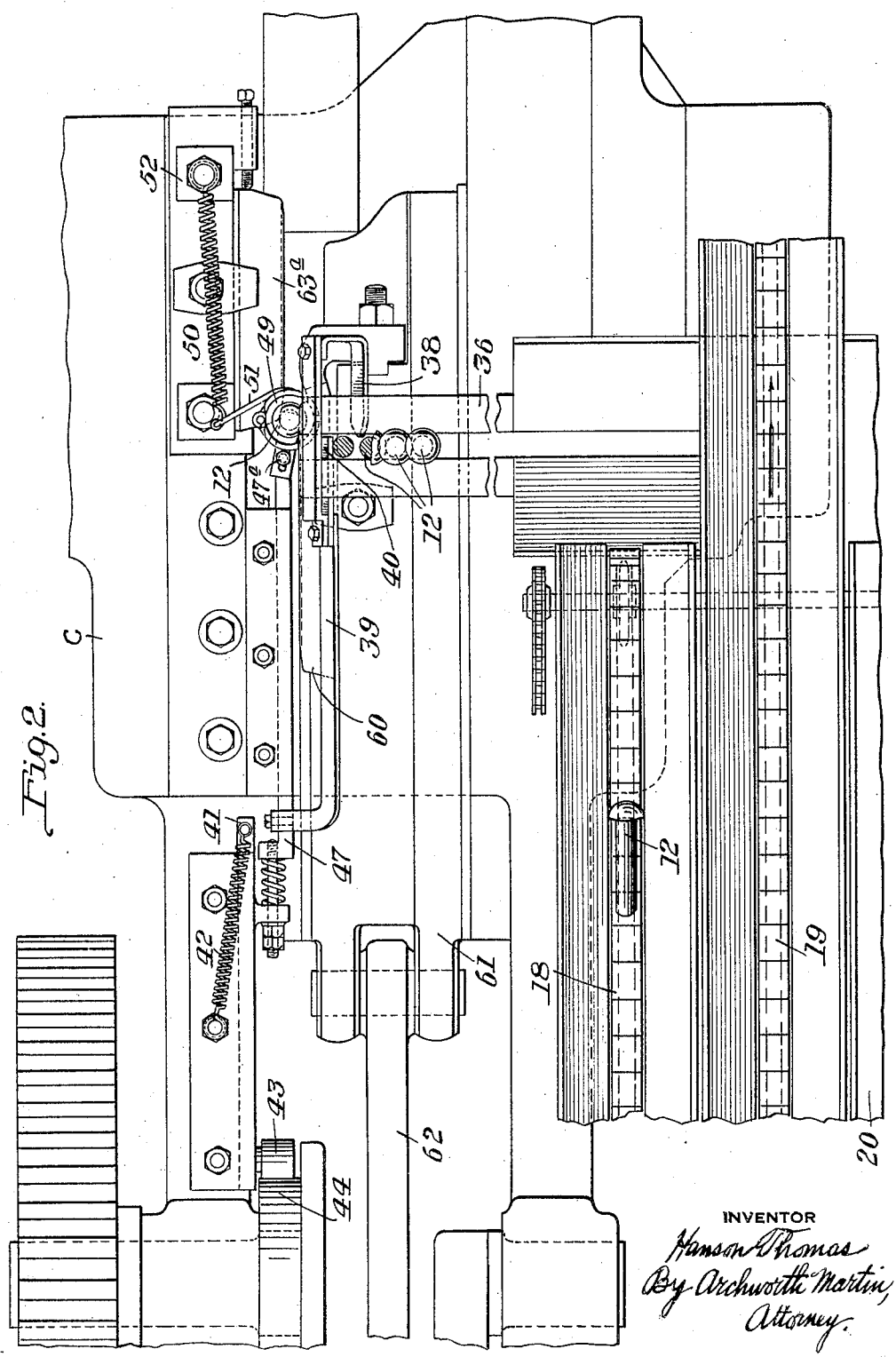

Nov. 5, 1929.  H. THOMAS  1,734,752
METHOD OF AND APPARATUS FOR MAKING BOLTS
Filed Jan. 26, 1927   4 Sheets-Sheet 3
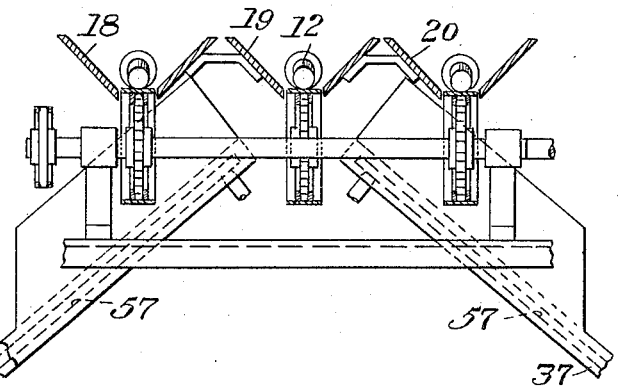
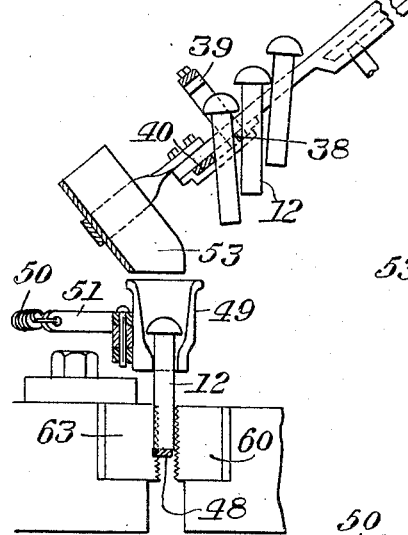
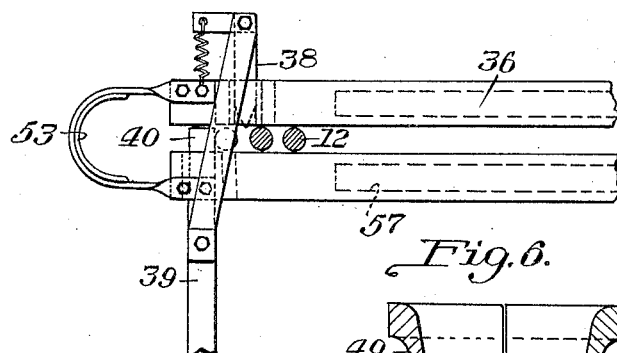
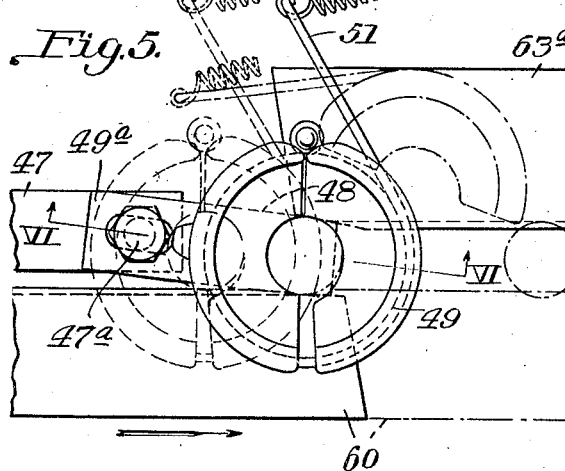
INVENTOR
Hanson Thomas
By Archworth Martin,
Attorney.

Nov. 5, 1929.   H. THOMAS   1,734,752
METHOD OF AND APPARATUS FOR MAKING BOLTS
Filed Jan. 26, 1927   4 Sheets-Sheet 4
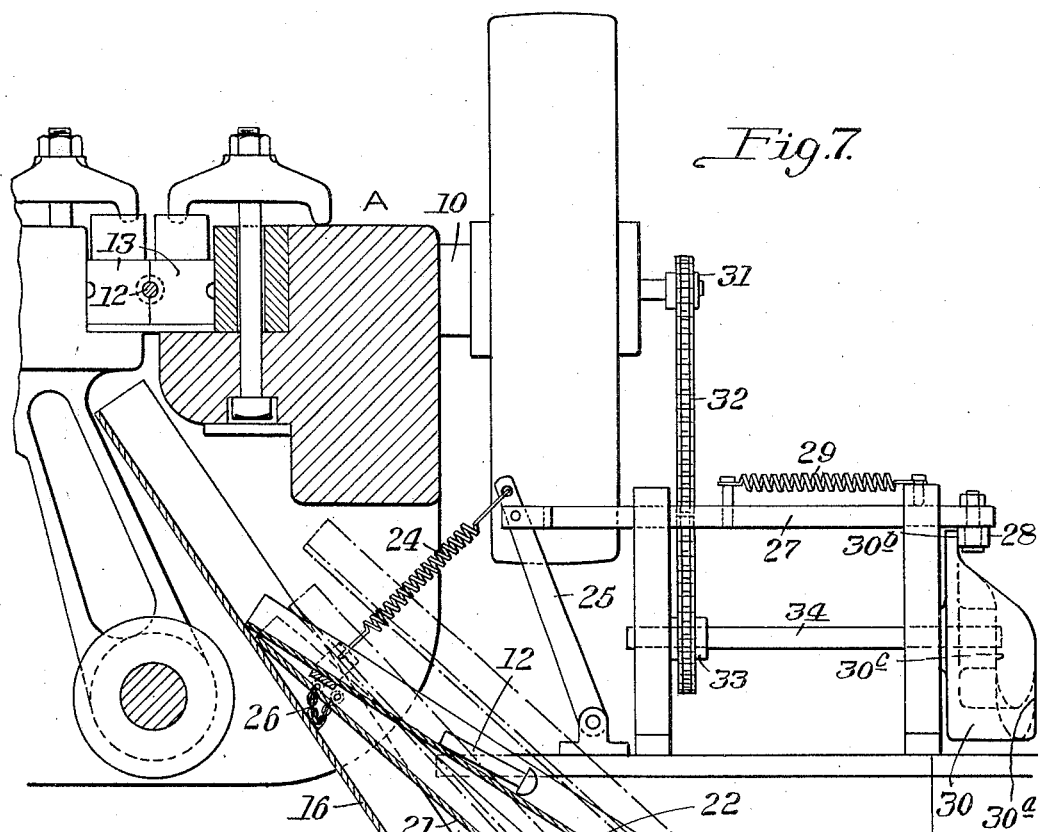
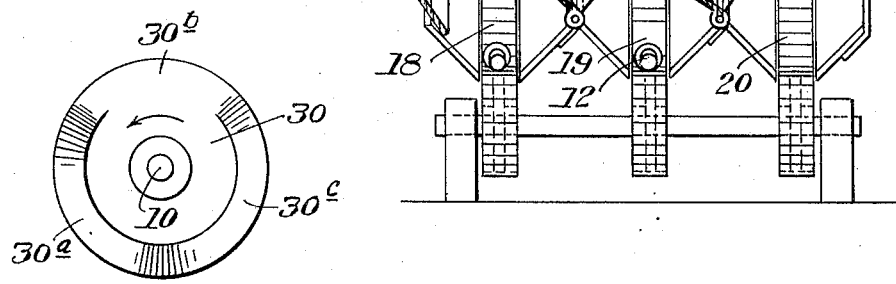

Patented Nov. 5, 1929

1,734,752

UNITED STATES PATENT OFFICE

HANSON THOMAS, OF EDGEWORTH, PENNSYLVANIA

METHOD OF AND APPARATUS FOR MAKING BOLTS

Application filed January 26, 1927. Serial No. 163,653.

My invention relates more particularly to a method and apparatus for making bolts, but may be employed in connection with the manufacture of articles other than bolts.

Broadly stated, my invention comprises means, operating in cooperation with a bolt heading machine, for transferring headed bolt blanks to threading dies, and has for one of its objects the provision of an improved form of transfer mechanism whereby the headed blanks may be conveniently distributed to a plurality of threading mechanisms, in cases where the capacity of a single set of threading dies is not equal to the output of a set of heading dies.

Another object of my invention is to provide an improved form of feed mechanism whereby blanks are fed to threading dies at properly timed intervals and in proper alinement with respect to the dies.

Still another object of my invention is to improve generally upon previously known methods and apparatus for operating upon bolt blanks and the like.

One form of apparatus by which my invention may be practised is shown in the accompanying drawing, wherein Figure 1 is a plan view of a portion of the apparatus; Fig. 2 is a sectional plan view, on an enlarged scale, of a part of the apparatus of Fig. 1; Fig. 3 is a view taken on the line III—III of Fig. 1, but on an enlarged scale; Fig. 4 is a plan view of a portion of the apparatus of Fig. 3; Fig. 5 is a plan view of a portion of the apparatus of Fig. 3, but taken on a lower plane than Fig. 4; Fig. 6 is a view taken on the line VI—VI of Fig. 5; Fig. 7 is a view taken on the line VII—VII of Fig. 1, and Fig. 8 is an end elevational view of the cam of Fig. 7.

The apparatus relates to means for transferring bolt blanks from a heading machine A, by means of conveyer structure B, to threading mechanisms C, through instrumentalities to be herinafter described in detail.

The heading die A may be any one of various well known types and may be briefly stated as comprising a driving shaft 10 that is driven from any suitable source of power (not shown), to operate the various die members by means of which a blank is cut from a stock bar 11 and headed. The bar 11 is advanced in any suitable manner well known in the art, and suitable cutting dies are operated to cut therefrom bolt blanks 12 of the desired length, such blanks being engaged by gripping dies 13 during the actuation of a heading die 14 by an eccentric rod 15, to form a head upon the blank 12. When the blank 12 is released by the gripping dies, it falls into a chute 16, from which it is carried to the threading dies.

Ordinarily, one set of threading dies cannot be operated with sufficient rapidity to thread all of the blanks formed upon a heading machine. It is therefore desirable to provide means for transferring the headed blanks to two or more sets of threading dies alternately. I have therefore shown three conveyers that are numbered 18, 19, and 20, respectively, that receive the blanks and carry them to the threading mechanisms C, only two of which are shown.

In order to direct the blanks from the chute 16 to the conveyers 18, 19 and 20 in succession, I provide slides 21 and 22 that are alternately brought into position to divert blanks 12 to the conveyers 19 and 20 respectively. When the slides 21 and 22 are both in spaced relation to the chute 16, the blanks will pass directly from said chute to the conveyer 18. The conveyers 18, 19 and 20 may be driven from any suitable source of power (not shown).

The slide 22 is connected, through a spring 24, with a pivotally mounted lever 25 and a chain 26 connects the slide 21 to the slide 22, so that when the lever 25 is moved to the right, as viewed in Fig. 7, for a sufficient distance, the slide 21 will be drawn from the chute 16 far enough to permit a bolt blank to pass down said chute to the conveyer 18. At an intermediate position of the lever 25, the slide 21 will lie against the chute 16, but the upper end of the slide 22 will be spaced from the upper end of the slide 21 a sufficient distance to permit bolt blanks to pass down the slide 21 into the conveyer 19. When the upper end of the slide 22 is permitted to lie against the chute 16, the blanks will be diverted into the conveyer 20.

The lever 25 is operated through a link 27 that is provided on its outer end with a roller 28. A tension spring 29 maintains the roller 28 in engagement with the outer face of a cam disc 30 that is driven from the shaft 10, through a sprocket 31, chain 32, sprocket 33 and a shaft 34. The cam disc 30 is provided with what may be termed "high," "low" and "intermediate" points as designated at 30ª, 30ᵇ, and 30ᶜ respectively. When the low point 30ᵇ is opposite the roller 28, the slides occupy the position shown in full lines in Fig. 7, so that blanks will be diverted to the conveyer 20. The speed of rotation of the shaft 34 is such that after a blank has been delivered to the slide 22, the intermediate raised portion 30ᶜ of the cam disc will move the link 27 to the right a sufficient distance to lift the slide 22 away from the chute and permit the next blank to pass down the slide 21, and the raised portion 30ª of the cam will move the link 27 still farther to the right, to cause the slide 21 to be lifted clear of the chute 16, by reason of its link connection 26 with the slide 22, so that the next following blank will enter the conveyer 18. From the high points 30ª to the low point 30ᵇ of the cam, the descent is quite steep, so that the slides quickly return to the full-line position shown in Fig. 7.

The conveyers 18, 19 and 20 distribute the blanks to the various threading machines C (only two of which are shown). From the upper ends of the conveyers 18 and 20, the blanks are delivered, in opposite directions, to slideways 36 and 37 respectively, leading to threading mechanism C. Since the blanks are delivered from these slideways to their associated machines in the same manner, it will be necessary to describe only one set of apparatus. When the blanks 12 fall from the conveyer 18 into the slideway 36, their body portions or shanks drop through a slot in the slideway, so that their heads, which are of greater width than said slot, will serve to support the blanks as they slide down against a stop bar 40 (Figs. 2, 3 and 4). A separator bar 38 is carried by a bracket 39 which also carries the stop member 40. The bracket 39 is slidably connected to a slide member 41 that is normally held in retracted position by a spring 42, as shown in Fig. 2. The slide 41 carries a cam roller 43 which engages the edge of a cam disc 44 that is driven from a shaft 46 (Fig. 1), through suitable connections, from a source of power (not shown). A bracket arm 47 also has connection with the slide bar 41 and at its outer end supports a gage bar 48 (Fig. 6) and a cup or funnel 49. The cup 49 is secured to the arm 47 by its extended portion 49ª and a screw 47ª, and is formed of half portions that are hinged together as shown more clearly in Figs. 2 and 5, the movable half-portions being yieldably held in closed position by a spring 50, one end of which is anchored to a stationary die holder 52 and the other end of which is connected to an arm 51 that is rigidly secured to the movable half of the spring cup.

Above the cup 49, I mount a chute or spout 53 that serves to guide the blanks 12 into the cup 49, in a manner that will be apparent from an inspection of Fig. 3.

When the blanks enter the cup 49, their lower ends will rest upon the gage bar 48 that is removably mounted so that other bars may be substituted therefor in order to permit the bolt to project below the cup such distance that threads will be formed thereon to the desired extent, since the cup is mounted in definitely spaced relation to the dies, as shown in Fig. 3, so that if the bolt is delivered between the dies at a higher position than that shown in Fig. 3, a smaller number of thread turns will be formed thereon.

A moving die 60 is mounted upon a carrier 61 that is connected to an eccentric rod 62 that is in turn connected to an eccentric 63 which is driven from the shaft 46, by suitable connections.

When a series of bolt blanks lie in the slideway 36, as shown in Figs. 2 and 4, retractive movement of the die carrier 61 will draw the stop 40 clear of the foremost bolt, permitting it to fall into the spout 53 and thence into the funnel, to the position shown in Fig. 6. Simultaneously with this retractive movement, the separator bar 38 engages the next succeeding bolt to prevent it from also passing from a slideway 36 into the cup. With the die carrier 61 in retracted position, the movable die 60 is so disposed relative to the stationary die 63ª that advancing movement of the slide 41 will advance the funnel 49 a short distance to carry the lower protruding end of the blank 12 into operative position with respect to the moving die 60 and the stationary die 63. When the funnel reaches its limit of advancing movement, the blank has been caught by the moving die and it will be carried out of the spring cup, against tension of the spring 50, the halves of the cup separating in order to permit the blanks to pass between the same. During forward movement of the die 60, threads are rolled upon the blank and it will be discharged from between the dies at the end of the forward stroke of the movable die.

During advancing movement of the cup 49 and the movable die, the stop 40 is advanced to the operative position shown in Fig. 4 and the separator bar 38 withdrawn to permit the succeeding blank to move down against the stop 40, so that upon retractive movement of the bracket 41 and the die carrier 61, such next blank will be delivered to the cup 49. The blanks are preferably delivered from the heading machine A at such rate of speed that they are still hot at the threading dies. For this reason, the slideway 36 may become heated to such a degree that the blanks will not slide freely therein, in which event, cored passages 57 (Fig. 4) will permit the introduction of a cooling fluid.

It will be understood that the invention is applicable to other arts than that of bolt making, in that mechanism other than bolt-heading apparatus may be employed for performing an operation upon articles and that apparatus corresponding to the chute and slides of Fig. 7 may be employed for transferring such articles to mechanisms other than the threading mechanisms, selectively. It will be further understood that any desired number of slides may be employed in lieu of the slides 21 and 22 and that the cam disc 30 may have its dwell surfaces so arranged and be driven at such rate of speed as to cause any desired number of blanks to be delivered to a given conveyer before succeeding blanks are diverted to another conveyer.

I claim as my invention:—

1. Bolt threading apparatus comprising a pair of threading dies, means for moving one of said dies, a positioning device for supporting bolt blanks in position for engagement by the dies, feed mechanism, means for reciprocating said device, and means controlled directly by movement of the positioning device, for operating the feed mechanism to supply blanks to said device.

2. Bolt threading apparatus comprising a pair of threading dies, means for moving one of said dies, a positioning device for supporting bolt blanks in position for engagement by the dies, feed mechanism, means for reciprocating said device, means controlled directly by movement of the positioning device, for operating the feed mechanism to supply blanks to said device, and means for automatically effecting release of blanks from the said device during operation upon the blanks by the dies.

3. Bolt threading apparatus comprising a pair of threading dies, means for moving one of said dies, a cup open at its bottom and arranged to support bolt blanks with their lower ends protruding from the bottom of the cup, a chute for the blanks, means for reciprocating the cup and stop and release members carried by the cup for releasing blanks from said chute, one by one during reciprocatory movement of the cup.

4. Bolt threading apparatus comprising a pair of threading dies, means for moving one of said dies, a cup open at its bottom and arranged to support bolt blanks with their lower ends protruding from the bottom of the cup, a chute for the blanks, means for reciprocating the cup, and stop and release members carried by the cup for releasing blanks from said chute, one by one, during reciprocatory movement of the cup, the cup being composed of two parts yieldably held closed, to permit withdrawal of the blanks therefrom when engaged by the dies.

In testimony whereof I, the said HANSON THOMAS, have hereunto set my hand.

HANSON THOMAS.